T. C. MOORSHEAD.
GLASS FURNACE.
APPLICATION FILED MAR. 3, 1917.
1,262,375.
Patented Apr. 9, 1918.
2 SHEETS—SHEET 1.
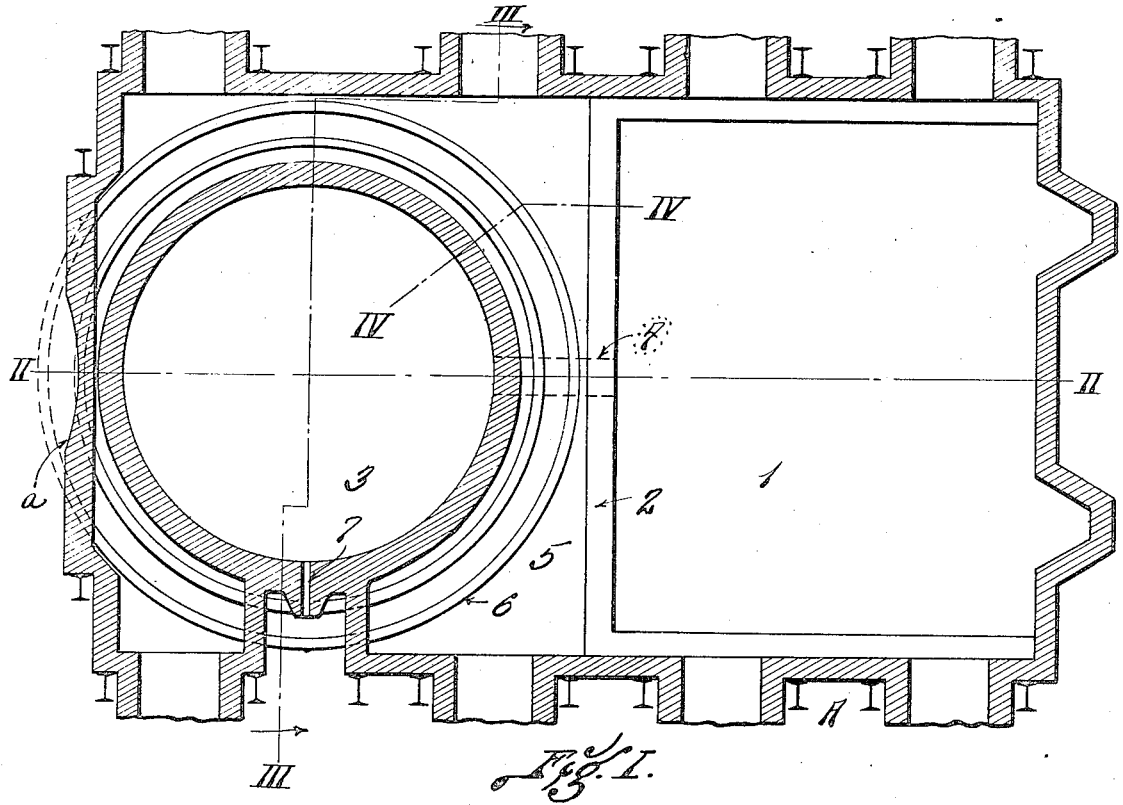
Fig. I.
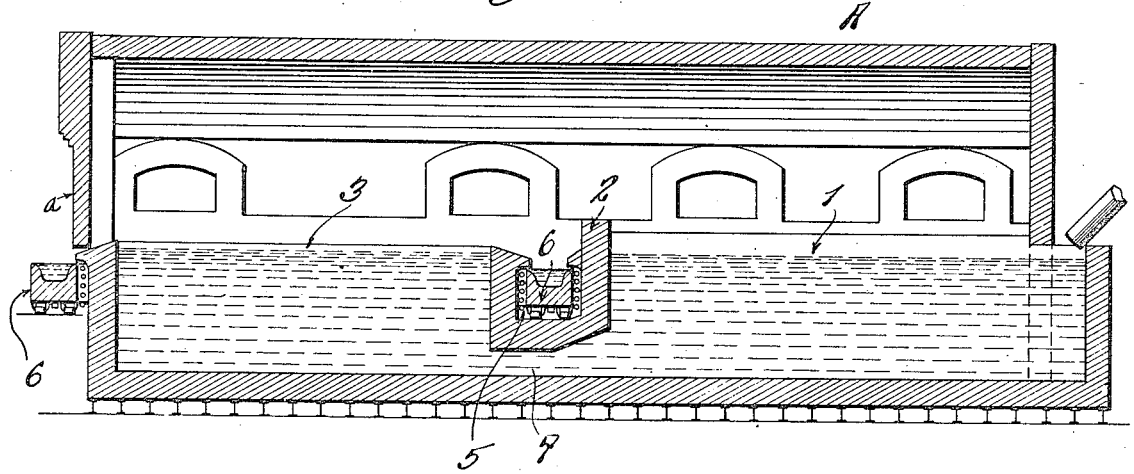
Fig. II.
INVENTOR.
T. C. Moorshead,
BY
ATTORNEY.

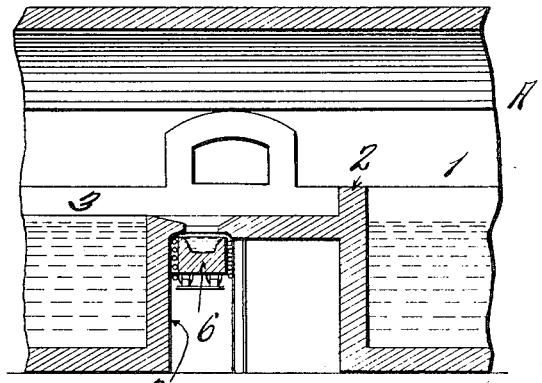
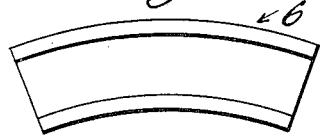
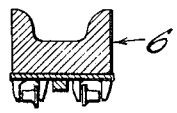
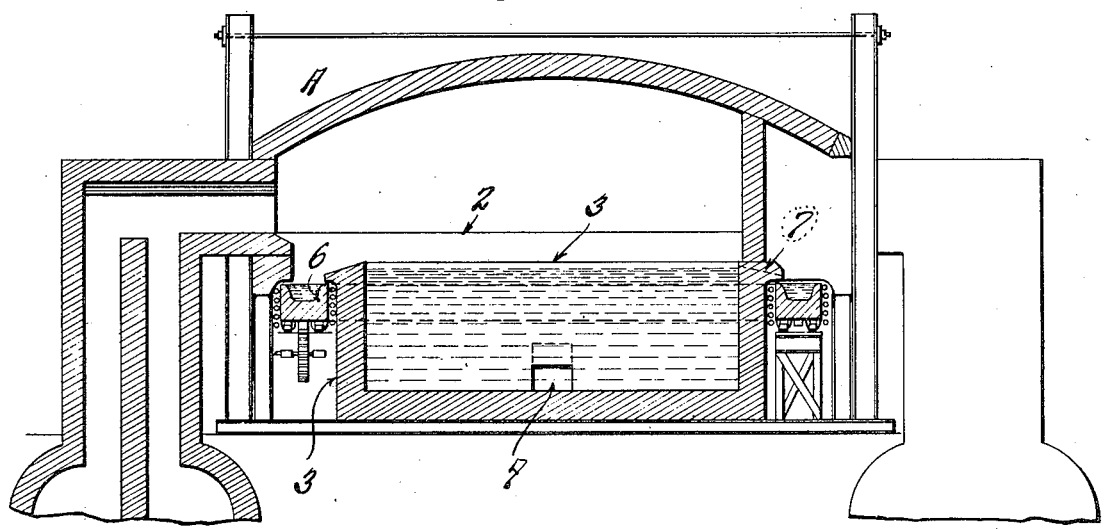

UNITED STATES PATENT OFFICE.

THOMAS C. MOORSHEAD, OF ALTON, ILLINOIS.

GLASS-FURNACE.

1,262,375.

Specification of Letters Patent.

Patented Apr. 9, 1918.

Application filed March 3, 1917. Serial No. 152,361.

*To all whom it may concern:*

Be it known that I, THOMAS C. MOORSHEAD, a citizen of the United States of America, and resident of Alton, in the county of Madison, State of Illinois, have invented certain new and useful Improvements in Glass-Furnaces, of which the following is a full, clear, and exact description, reference being had to the accompanying drawing, forming a part of this specification.

My invention relates to a glass furnace of the type with which automatic glass gathering machines may be used, this type of glass furnace usually including a molten glass receptacle which is partially exposed at the exterior of the furnace in order that a glass gathering machine may be supplied directly from the furnace. In a furnace of this kind the glass exposed to the atmosphere at the point where it is to be picked up by the glass gathering machine becomes chilled, and it has been found necessary to utilize a movable container into which the molten glass is delivered from the melting chamber and conducted to the point of exposure, such movable chamber being kept constantly in motion, in order that the molten glass which has been exposed to the atmosphere will be carried into a heated part of the furnace, and an unchilled portion of the molten glass be brought into exposed position and accessible to the glass gathering machine. This provision of a movable container is further found necessary on account of the return of the chilled cut-off from the glass gathering machine to the container and which requires to be reheated to render it workable. The type of glass furnace at present most commonly in use comprises a melting chamber, and a revolving tank rotatably mounted in a separate chamber, this construction making it possible for the glass to become chilled while passing from the melting tank to the revolving tank, and such a construction of furnace necessitates greater expense in constantly re-heating the glass delivered to the revolving tank to keep it at the proper consistency.

My invention has for its object to so construct a glass furnace that the molten glass in the melting tank will be delivered to a refining tank which is constantly in communication with the melting tank, at a point beneath the level of the glass in either tank, and to provide a circular delivery trough rotatable around the refining tank which receives a supply of molten glass therefrom and conducts it to a point of exposure at the exterior of the furnace at which a glass gathering machine may be supplied. In a furnace so constructed molten glass is fed to the rotatable trough and carried to and away from the point of exposure, the small body of molten glass being constantly kept of the proper consistency due to the fact that it surrounds and is kept heated by the refining tank.

Figure I is a horizontal section through my furnace.

Fig. II is a vertical section through the furnace on line II—II, Fig. I.

Fig. III is a vertical cross section taken on line III—III, Fig. I.

Fig. IV is a vertical section taken on line IV—IV, Fig. I.

Fig. V is a top view of a fragment of the circular trough.

Fig. VI is a cross section through the circular trough.

In the accompanying drawings, A designates my furnace as a whole, the said furnace being provided with suitable means for heating the interior thereof, such as is ordinarily employed in the operation of glass furnaces.

Within the furnace A is a melting tank 1. At the back of the melting tank 1 is a bridge wall 2 which separates said melting tank from refining tank chamber containing a refining tank 3 arranged in communication with the melting tank through the medium of a duct 4 leading from the bottom of the melting tank to the bottom of said refining tank.

The refining tank 3 is preferably of circular shape, as shown, and is surrounded by a runway 5 beneath which the duct 4 extends, as seen in full lines Fig. II and dotted lines Fig. I.

A circular trough 6 surrounds the circular refining tank 3 and is adapted to be rotated therearound by any suitable means, the trough being provided with supporting wheels which may ride upon a track provided therefor in the runway 5.

The circular trough 6 is adapted to receive molten glass from the refining tank 3 and, by operating through an opening in a wall of the furnace, deliver it to a point of exposure at the exterior of the furnace in order that the molten glass may be taken from the trough by a glass gathering machine, delivery of the molten glass into the trough being made possible by providing an outlet channel 7 in the wall of the refining tank which runway leads to the circular trough. Access to the trough by the glass gathering machine is permitted by extending said trough through a wall of the furnace, as seen at *a* Figs. I and II.

During the operation of my furnace, the molten glass produced in the melting tank 1 flows through the duct 4 to the refining tank 3 to keep the latter constantly supplied, the flow of molten glass through the channel 7 from the refining tank to the circular trough 6 surrounding it being controlled in any suitable manner. The circular trough is rotated around the circular refining tank and the body of molten glass delivered thereinto is exposed exteriorly of the furnace at *a* for only a limited period, during which glass may be taken therefrom by a glass gathering machine located at this point.

It will be apparent that by using a circular trough for the delivery of molten glass to the exterior of a furnace, as contemplated by my improvement, it is possible to expose only a small quantity of glass to the cooling action at the exterior of the furnace, and, furthermore, possible to readily heat the minimum quantity of glass in the trough after it has become chilled and is returned to the interior of the furnace during the movement of the trough. The glass in the trough may, therefore, be maintained at the proper consistency, notwithstanding the deposit of chilled cuttings of molten glass returned to the trough from the glass gathering machine, these cuttings being readily re-melted to workable consistency due to the temperature of the glass in the circular trough being maintained at a high enough degree to cause re-melting of the cuttings before the portion of the trough into which they are deposited has been again brought to the opening at which the glass gathering machine is located.

I claim:—

1. A glass furnace comprising a melting tank, a refining tank chamber located alongside of said melting tank and separated therefrom by a bridge wall, said refining tank chamber having an opening in an outer wall thereof, a stationary refining tank in said refining tank chamber partially surrounded by a runway leading to the opening in the outer wall of said refining tank chamber and extending between the refining tank and said bridge wall, the refining tank being in communication with the bottom of said melting tank, and a circular trough in said runway to which molten glass is delivered from said refining tank, said circular trough being movable around said stationary refining tank to receive molten glass from the refining tank and deliver it to the opening in the wall of the refining tank chamber.

2. A glass furnace comprising a melting tank, a refining tank having communication with the bottom of said melting tank, and a revoluble circular trough surrounding said refining tank above the level of the passageway connecting the tanks, into which molten glass may be delivered from said refining tank, said circular trough being operable partially within the furnace and partially at the exterior of the furnace.

In testimony that I claim the foregoing I hereunto affix my signature.

THOMAS C. MOORSHEAD.